(12) United States Patent
Taylor

(10) Patent No.: US 9,635,939 B2
(45) Date of Patent: May 2, 2017

(54) COVERED SLIDING OPERATOR

(71) Applicant: Philip Taylor, Warwickshire (GB)

(72) Inventor: Philip Taylor, Warwickshire (GB)

( * ) Notice: Subject to any disclaimer, the term of this patent is extended or adjusted under 35 U.S.C. 154(b) by 0 days.

(21) Appl. No.: 14/777,930

(22) PCT Filed: Mar. 25, 2014

(86) PCT No.: PCT/GB2014/050933
§ 371 (c)(1),
(2) Date: Sep. 17, 2015

(87) PCT Pub. No.: WO2014/155087
PCT Pub. Date: Oct. 2, 2014

(65) Prior Publication Data
US 2016/0278523 A1    Sep. 29, 2016

(30) Foreign Application Priority Data

Mar. 25, 2013 (GB) .................................. 1305364.0

(51) Int. Cl.
  *A47B 13/02* (2006.01)
  *A47B 91/02* (2006.01)
  (Continued)

(52) U.S. Cl.
  CPC ............ *A47B 91/02* (2013.01); *A47B 13/023* (2013.01); *A47B 91/16* (2013.01); *F16H 21/04* (2013.01); *F16H 21/44* (2013.01)

(58) Field of Classification Search
  CPC ................... A47B 13/02; A47B 13/023; A47B 2200/0021; A47B 2200/0051; A47B 9/00;
  (Continued)

(56) References Cited

U.S. PATENT DOCUMENTS

| | | | | |
|---|---|---|---|---|
| 587,181 A | * | 7/1897 | Busch et al. ......... | A47B 13/081 108/140 |
| 1,899,835 A | * | 2/1933 | Thum ..................... | A47B 9/08 108/150 |

(Continued)

FOREIGN PATENT DOCUMENTS

| | | |
|---|---|---|
| DE | 19503894 A1 | 8/1996 |
| DE | 19926602 A1 | 8/2000 |

(Continued)

*Primary Examiner* — Jose V Chen
(74) *Attorney, Agent, or Firm* — Eckert Seamans Cherin & Mellott, LLC; David C. Jenkins

(57) ABSTRACT

A covered sliding operator includes a body; a slot formed in the body; a spindle extending through the slot and which is slidable along the length of the slot; and a generally oval cover rotatably mounted on the spindle. The body has a first impinging wall and a second impinging wall. The cover is shaped such that: when the spindle is central in the slot, the cover completely covers the slot; moving the spindle towards the first end of the slot moves the cover against the first impinging wall and causes it to rotate in a first direction such that the slot remains completely covered by the cover; and moving the spindle towards the second end of the slot moves the cover against the second impinging wall and causes it to rotate in a second direction such that the slot remains completely covered by the cover.

19 Claims, 5 Drawing Sheets

(51) Int. Cl.
*A47B 91/16* (2006.01)
*F16H 21/04* (2006.01)
*F16H 21/44* (2006.01)

(58) Field of Classification Search
CPC .......... E04C 3/005; F16B 7/1427; F16B 7/10; F16B 7/105; F16B 7/14; B60N 2/07
USPC ............... 108/144.11, 150, 147.19; 248/161, 248/406.1, 420
See application file for complete search history.

(56) References Cited

U.S. PATENT DOCUMENTS

| | | | | |
|---|---|---|---|---|
| 2,324,717 | A * | 7/1943 | Novak | A22B 5/06 248/351 |
| 3,469,870 | A * | 9/1969 | Barkus | E04G 25/06 108/150 |
| 3,814,362 | A | 6/1974 | Ritchie | |
| 3,879,084 | A * | 4/1975 | Jones | A47B 91/00 108/150 |
| 3,908,565 | A * | 9/1975 | Burnett | A47B 9/04 108/103 |
| 5,690,303 | A | 11/1997 | Winters | |
| 6,131,870 | A * | 10/2000 | Tseng | A47B 9/04 108/147 |
| 6,840,180 | B2 * | 1/2005 | Ulmer | A47B 13/023 108/13 |
| 2010/0058883 | A1 | 3/2010 | Zhang et al. | |
| 2012/0152156 | A1 * | 6/2012 | Watson | A47B 13/06 108/150 |
| 2013/0333595 | A1 * | 12/2013 | Cotey | A47B 3/0815 108/42 |

FOREIGN PATENT DOCUMENTS

| | | |
|---|---|---|
| DE | 10024346 A1 | 5/2001 |
| FR | 2673821 A1 | 9/1992 |
| GB | 172195 A | 12/1921 |
| JP | 2001304407 A | 10/2001 |
| JP | 2008239055 A | 10/2008 |

* cited by examiner

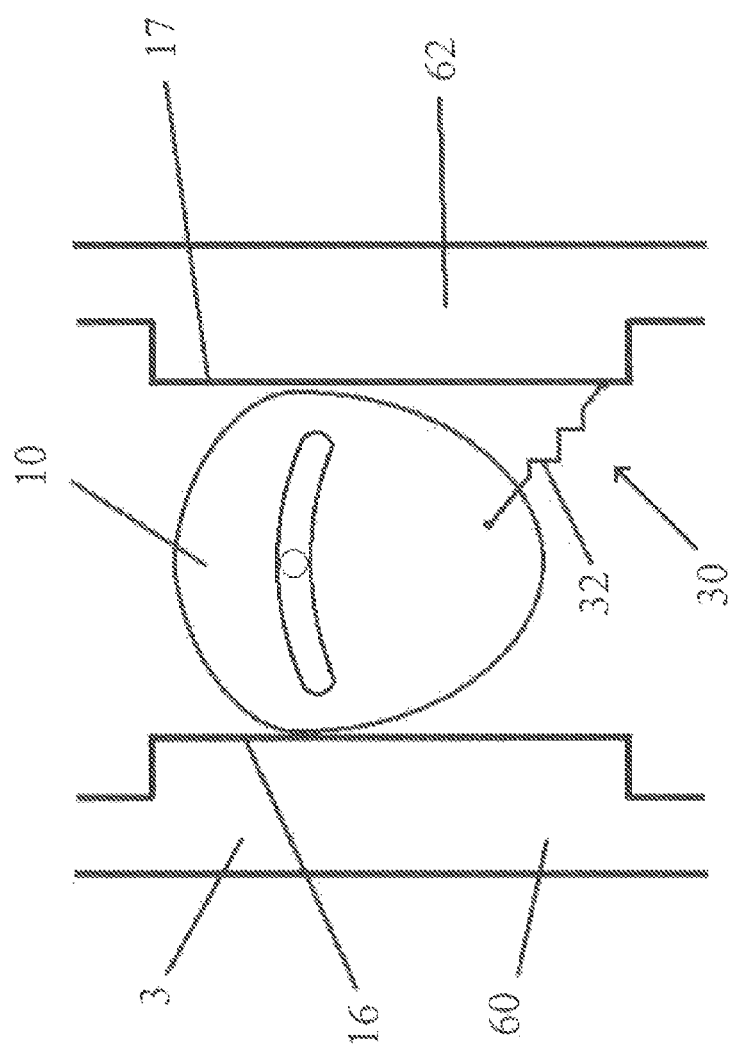

COVERED SLIDING OPERATOR

FIELD OF INVENTION

The present invention relates to mechanisms that operate by sliding a spindle along a slot i.e. sliding operators. The invention provides an improved sliding operator that can prevent users injuring themselves by inserting their fingers into the slot of the sliding operator.

DESCRIPTION OF PRIOR ART

Tables and other similar items of furniture, which are not properly maintained or manufactured, often do not sit flatly on all of their legs when placed on a flat surface. Similarly, tables and other similar items of furniture that are intended to be used on a flat surface do not sit properly on surfaces that are uneven. This can result in the furniture wobbling when pressure is applied to them. In order to remedy this problem adjustable single pedestal tables have been designed. These tables have a single pedestal with a plurality of feet extending from the bottom. An adjusting mechanism allows one or more of the feet to be moved relative to the pedestal. By properly adjusting the feet of the table using the adjusting mechanism the table can be made to sit properly on both flat and uneven surfaces.

Various adjusting mechanisms and constructions for adjustable single pedestal tables have been proposed. One such construction and mechanism is shown in FIGS. 1, 2 and 3 and is described below.

A single pedestal table 1 is shown in FIG. 1. The table 1 comprises a top 2 that is fixed to a leg housing 3. The leg housing 3 is formed from substantially rectangular box section steel and is hollow. The leg housing 3 contains two upright clamp bars 4 that are each pivotally mounted to the leg housing 3 just above a lower end by means of a pivot fixing 7. The lower end of each clamp bar 4 extends a short distance beyond a bottom edge of the housing 3. An upper end of each clamp bar is mounted, by means of a spindle 5 through a slot 6 formed in the housing 3. By moving the spindle 5 along the slot 6 each clamp bar 4 can be rotated through a small degree of rotation about the pivot fixing 7. The spindle 5 comprises clamping means at an outer side that allow the spindle and clamp bar 4 to be fixed in position relative to the slot 6 and housing 3. A dual foot 8 is formed at the lower end of each clamp bar 4. Together the two dual feet 8 form a stable platform upon which the table 1 rests.

The single pedestal table 1 is used in the following manner. When placed on a completely flat surface each clamp bar 4 will be fixed by the clamping means of the spindle 5 at the mid point of the slot 6 and the table 1 will sit flat on the surface. However, if the surface is not even then the table 1 will need adjusting to sit flat on the surface. This is done by unclamping one or both clamp bars 4 and allowing the weight of the table and/or applying pressure on the top of the table 1 to move the dual feet into a position where the table is supported on the feet equally and it no longer wobbles. Applying this pressure will move one or both clamp bars 4 along their respective slots 6. When the table 1 no longer wobbles the clamp bars are then clamped in position in the slots 6 using the clamping means of the spindles 5. The adjusted table 1 will then be sitting flat on the surface. This mechanism has been found to be an effective and simple way of providing a table that can be easily adjusted to sit flat on an uneven surface.

Although the table 1 shown in FIGS. 1 to 3 has a mechanism that is simple and effective, this mechanism has one significant issue. When the clamp bars 4 are not clamped in position by the clamping means of the spindles 5 they can freely move along the slots 6. Furthermore, it is possible for a person to insert their fingers in the slot 6. This leads to the potential danger of crushing injuries. In particular, a user's finger could get crushed between the spindle 5 and an edge of the slot 6 or otherwise injured. This is possible whenever a clamp bar 4 is unclamped, even if a user is not actively adjusting the table 1, as the weight of the table 1 or a force applied to the top of the table 2 could cause the clamp bar 4 to move along a slot 6. This is a particular issue for children who have relatively small fingers and may be more curious and therefore more likely to stick their fingers in the unguarded slot. Furthermore, a curious child may even unclamp a clamp bar 4.

In light of the above, there is a need for an improved sliding operator that could be used with the adjustable table described above that would prevent or reduce the possibility of a child or other person injuring their fingers. Preferably any such mechanism would also be able to be used in other similar apparatus that are adjusted by or comprise a sliding operator.

SUMMARY OF INVENTION

The present invention provides a covered sliding operator comprising:
 a body;
 a slot formed in the body having a first end and a second end and a length extending from the first end to the second end;
 a spindle extending through the slot and mounted to be slidable along the length of the slot; and
 a generally oval cover rotatably mounted on the spindle; wherein,
the body has a first impinging wall formed on an inner side of the slot and spaced a distance from the first end of the slot and a second impinging wall formed on an inner side of the slot and spaced a distance from the second end of the slot; and
 the cover is shaped such that:
 when the spindle is central in the slot a width of the cover completely covers the slot, from the first end to the second;
 moving the spindle towards the first end of the slot moves the cover against the first impinging wall and causes it to rotate in a first direction such that the slot remains completely covered by the cover; and
 moving the spindle towards the second end of the slot moves the cover against the second impinging wall and causes it to rotate in a second direction such that the slot remains completely covered by the cover.

The present invention is particularly useful for replacing any uncovered sliding operator wherein there is a danger of a user fitting all or part of a finger in the slot of the operator and thereby getting an injury caused by the spindle crushing their finger against the edge of the slot. The covered sliding operator prevents this as at all times the generally oval shaped cover will completely cover all parts of the slot where the spindle is not located, regardless of the location of the spindle along the slot. This prevents a user from fitting any part of a finger in the slot. This is achieved in the following manner.

The cover is shaped so that it completely covers the slot at all times. When the spindle is centrally located within the slot the width of the cover completely extends across the slot. This prevents the user inserting a finger into the slot on either side of the spindle.

When the spindle is moved from a position in the centre of the slot towards the first end of the slot the cover will impinge upon the first impinging wall. Due to the generally oval shape of the cover this impingement will cause the cover to rotate. This rotation will move the cover into a position wherein the slot remains covered. In particular, when the spindle is at a final position at or near the first end of the slot a length of the cover from the centre of the spindle will extend from the spindle towards the second end of the slot, completely covering the slot and a length of the cover from the centre of the spindle will extend from the spindle to the first impinging wall. Moving the spindle away from the first end of the slot back to the centre of the slot will cause the cover to rotate back to its original position. This rotation may be achieved by the force of gravity acting on the cover or by the use of a suitable biasing means, as discussed below.

When the spindle is moved from a position in the centre of the slot towards the second end of the slot the cover will impinge upon the second impinging wall. Due to the generally oval shape of the cover this impingement will cause the cover to rotate. This rotation will move the cover into a position wherein the slot remains covered. In particular, when the spindle is at a final position at or near the second end of the slot a length of the cover from the centre of the spindle will extend from the spindle towards the first end of the slot, completely covering the slot and a length of the cover from the centre of the spindle will extend from the spindle to the second impinging wall. Moving the spindle away from the second end of the slot back to the centre of the slot will cause the cover to rotate back to its original position. This rotation may be achieved by the force of gravity acting on the cover or by the use of a suitable biasing means, as discussed below.

The crucial features of the present invention are the generally oval shape of the cover and the location of the first and second impinging walls. A generally oval shape of a cover according to an embodiment of the invention is shown in FIG. 4. This cover has two perpendicular axes, has a gradually curved perimeter and has a central hole for mounting on the spindle. The perimeter of the cover intersects the perpendicular axes at four points about the perimeter. The distance from the centre of the hole to these four intersection points enables the functionality of the present invention. In a preferred embodiment of the invention, in a clockwise order about the perimeter of the cover:

the distance from a first intersection point to the centre of the hole is approximately equal to the distance from the first impinging wall to the position the hole is located in when the spindle is located at or near the first end of the slot and to the distance from the second impinging wall to the position the hole is located in when the spindle is located at or near the second end of the slot;

the distance from a second intersection point to the centre of the hole is equal to, or slightly greater than, the distance from the second end of the slot to the centre of the slot when the spindle is centrally located within the slot;

the distance from the third intersection point to the centre of the hole is equal to, or slightly greater than, the distance from the centre of the hole to the first end of the slot when the spindle is located at or near the second end of the slot and is equal to, or slightly greater than, the distance from the centre of the hole to the second end of the slot when the spindle is located at or near the first end of the slot; and the distance from the fourth intersection point to the centre of the hole is equal to, or slightly greater than, the distance from the first end of the slot to the centre of the slot when the spindle is centrally located within the slot.

It is envisaged that most embodiments of the invention will have covers that are shaped according to the above definition. However, other shapes of cover, which function in the same manner are also possible and also fall within the scope of the present invention. The precise dimensions, size and shape of the cover of the present invention will be dependent upon the shape and size of the slot and spindle and the distance of the first and second impinging walls from the first and second ends of the slot respectively. It is considered that the skilled person will be able to design an appropriately shaped cover for any specific embodiment of the present invention.

The first and/or second impinging walls of the present invention may be side walls of the body. Alternatively, the first and/or second impinging walls may simply be protrusions formed on the inner side of the body in an appropriate location. As will be readily appreciated, for any specific embodiment of the invention the choice of which of these constructions is appropriate will be determined by the apparatus of which the covered sliding operator forms. All that is essential is that the first and second side walls are sized and located in an appropriate position and are resilient enough to cause rotation of the cover as the spindle is moved towards the first and second ends of the slot respectively.

In a preferred embodiment of the invention the slot is generally horizontal such that the spindle may be moved along the slot in a substantially horizontal direction. A generally horizontal slot may be either completely straight or may be arcuate whereby the curvature of the slot is no more than a 45° section of a circle, and preferably no more than a 15° section of a circle. A generally horizontal slot is preferred as in these embodiments of the invention the generally oval cover may be mounted on the spindle such that it freely rotates and, when not impinging on either the first and second impinging walls, can simply hang on the spindle under the action of gravity.

Although it is generally preferred that the slot is generally horizontal, the present invention may also operate when the slot is not generally horizontal: for example, if the slot is generally vertical. In such embodiments the present invention may additionally comprise a biasing means for correctly orientating the cover when the cover is not impinging on either the first or second impinging walls. In a simple embodiment the biasing means may be an elastic body, such as a spring, that is attached at a first end to the cover and is attached at a second end to the body in such a manner that the cover is biased in the correct orientation. Other biasing means may also be utilised as will be apparent to the person skilled in the art.

The cover of the present invention may be formed of any suitable material, including but not limited to stainless steel and resilient plastic materials. Generally, it is preferred that the material of the cover is smooth and has a relatively low coefficient of friction in order to allow it to be rotated easily under the action of the first and second impinging walls and to ensure it does not stick against the inner side of the body. Additionally or alternatively, the cover and/or the inner side of the body may be greased or otherwise lubricated.

The spindle of the present invention may have a gripping means formed at an outer end in order to allow a user to easily grip the spindle and allow it to be moved along the slot. Additionally or alternatively, the spindle may comprise a bolt and have a nut or other clamping means mounted thereon to allow a user to clamp the spindle in a specific position along the slot. This can allow the covered sliding operator to be fixed in a specific position. This can be advantageous when the sliding operator is used to adjust an adjustable member, rather than simply move an adjustable member from a first position to a second position and back again.

If the spindle comprises a clamping means to allow a user to clamp the spindle in a specific position along the slot then the cover is particularly beneficial. Specifically, the cover can spread a clamping force provided by a clamping means over a greater area of the inner side of the body. This can allow the clamping means to operate more effectively than if the cover were not present.

The body of the present invention may be an integral part of a device of which the covered sliding operator forms a part. For example, the body may be a part of a housing, side wall or other structural component of such a device.

The covered sliding operator of the present invention may be useful for replacing an uncovered sliding operator of any apparatus. However, the covered sliding operator of the present invention is of particular use in an adjustable single pedestal table. That is, covered sliding operator may form the adjusting mechanism of an adjustable single pedestal table. The adjustable single pedestal table may operate according to the mechanism described in the background section of the present application. However, it is to be understood that various features of an adjustable single pedestal table comprising the covered sliding operator of the present invention may be modified from the specific embodiment described in the prior art section of the present application. The only essential feature is that the adjusting mechanism comprises a sliding operator. As examples, specific features that could be easily modified are the shape and size of the feet, shape and size of the top of the table, the size and shape of the housing and the manner in which the top of the table is fixed to the housing. Other features could also be modified and it is anticipated that any such modifications would be immediately apparent to a person skilled in the art.

Additionally, an adjustable double pedestal table may comprise one or more covered sliding operators according to the present invention. An adjustable double pedestal table may be formed in a similar manner to the single pedestal table that is described above wherein each pedestal of the double pedestal table has one or two clamp bars, formed and adjustable in the same manner as the clamp bars of the adjustable single pedestal table described above. Again, various features of a double pedestal table comprising one or more covered sliding operator according to the present invention could be easily modified by the person skilled in the art. Those features will be immediately apparent to a person skilled in the art.

Other devices which may comprise a covered sliding operator according to the present invention will be immediately apparent to the person skilled in the art.

Further features and advantages of the present invention will be apparent from the specific embodiment that is shown in the drawings and is described below.

DRAWINGS

FIG. 8 is a schematic drawing of a cover of an alternate embodiment.

Figure 4:
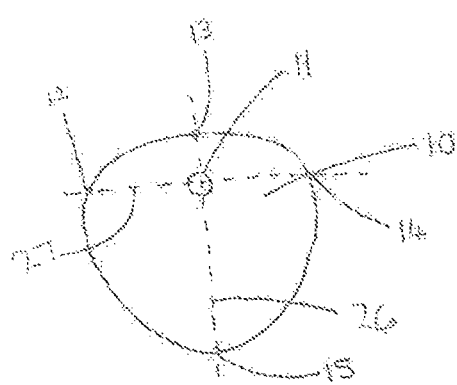
FIG. 4 is a schematic drawing of a cover of an embodiment of a sliding operator according to the present invention.

The cover 10 of an embodiment of a sliding operator according to the present invention is shown in FIG. 4. As can be seen, the cover 10 is substantially oval and is a similar shape to a standard guitar plectrum. The cover 10 is formed of a flat piece of sheet metal. The cover has a central hole 11 for mounting on a spindle 5. The centre of the hole 11 is formed at the intersection of a vertical axis 26 and a horizontal axis 27 of the cover 10. The cover 10 is symmetrical about the vertical axis. As set out below, the distance from the edge of the hole 11 to intersections 12, 13, 14, 15 of the edge of the cover 10 and the axes 26, 27 define the shape of the cover 10. Between these intersections 12, 13, 14, 15 the edge of the cover 10 has a gradually curved contour.

Figure 5:
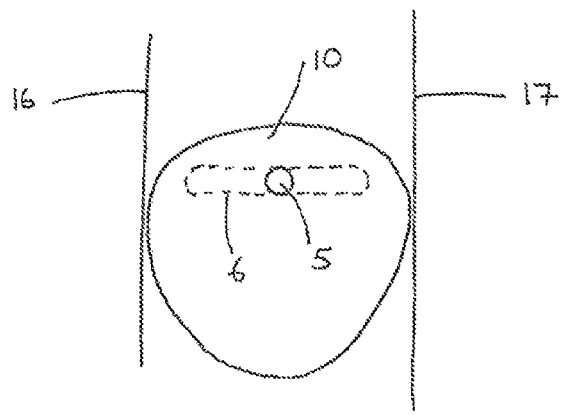
FIGS. 5 to 7 are schematic drawings of the sliding operator of FIG. 4 showing the operation of that operator.
Figure 6:
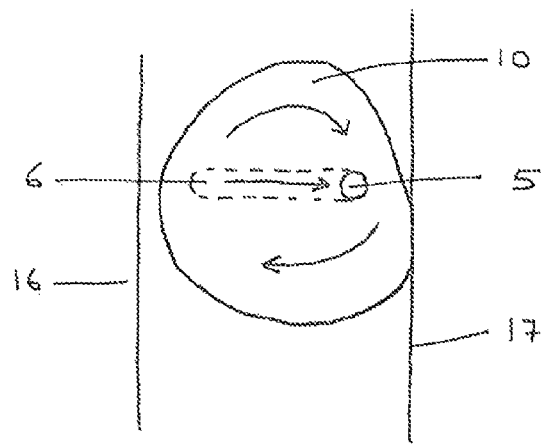
Figure 7:
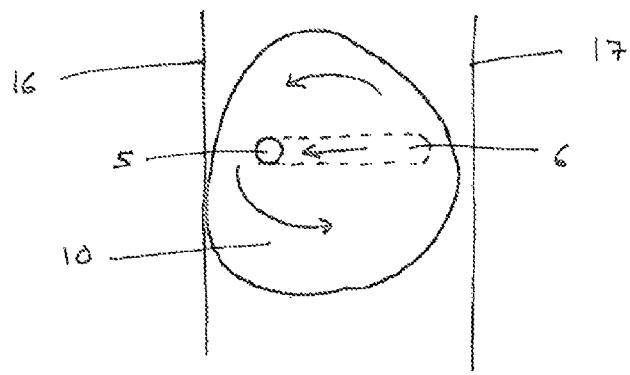

The cover 10 is intended for use with a sliding operator as shown in FIGS. 5 to 7. When in use, the cover 10 is freely rotatably mounted on a spindle 5 that is movable along a slot 6 that is formed in a body 3. The body forms a first impinging wall 16 a short distance from a first end of the slot 6 and a second impinging wall 17 the same short distance from a second end of the slot 6.

The cover 10 is sized such that the distance from a first intersection point 12 to a third intersection point 14 along the horizontal axis is greater than the width of the slot 6 and the hole 11 is substantially central along this distance but is less than a distance from the first impinging wall 16 to the second impinging wall 17. A distance from a second intersection point 13 to the centre of the hole 11 is just more than the distance from each end of the slot 6 to the adjacent impinging wall 16, 17. A distance from a fourth intersection point 15 to a centre of the hole is greater than the length of the slot 6 but less than the distance from a first end of the slot to the second impinging wall 17 and less than the distance from the second end of the slot to the first impinging wall 16. Having the cover 10 sized in this manner and having the impinging walls 16, 17 appropriately located allows the sliding operator of the present invention to operate in the manner described below.

The operation of the sliding operator is shown in FIGS. 5 to 7. When the spindle 5 is in the central position of the slot 6 the cover 10 will hang in a substantially vertical position under the action of gravity. The width of the cover 10 is sufficient to completely cover the slot 6.

When the spindle 5 is moved towards the second end of the slot 6 the cover contacts the second impinging wall 17 and is thereby rotated in the direction indicated in FIG. 6. This rotation moves the cover 10 in such a manner that the spindle 5 is allowed to be moved completely along the slot 6 to the second end of the slot but the cover 10 still covers the entire length of the slot. When the spindle 5 is moved from the second end of the slot 6 the cover 10 will rotate in the opposite direction under the action of gravity.

When the spindle 5 is moved towards the first end of the slot 6 the cover contacts the first impinging wall 16 and is thereby rotated in the direction indicated in FIG. 7. This rotation moves the cover 10 in such a manner that the spindle 5 is allowed to be moved completely along the slot 6 to the first end of the slot but the cover 10 still covers the entire length of the slot. When the spindle 5 is moved from the first end of the slot 6 the cover 10 will rotate in the opposite direction under the action of gravity.

Figure 1:
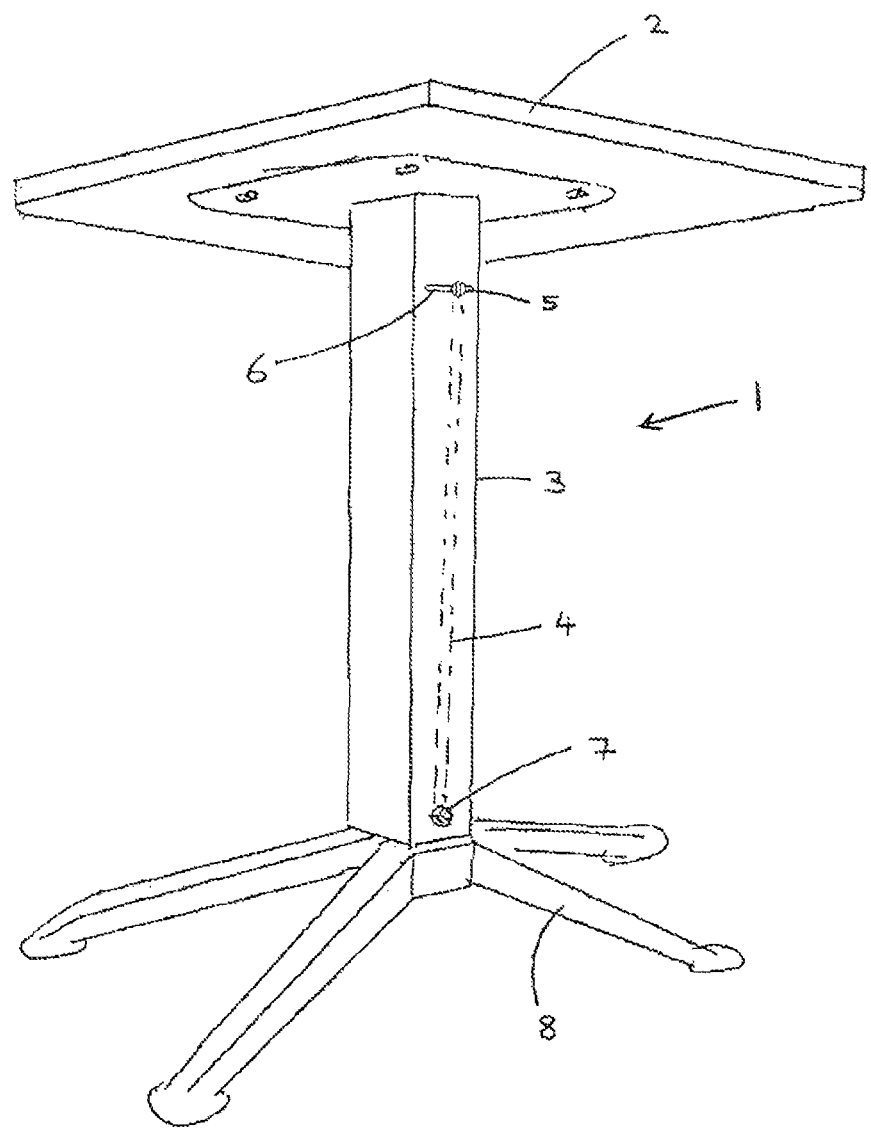
FIG. 1 is a schematic drawing of a adjustable single pedestal table according to the prior art.
Figure 2:
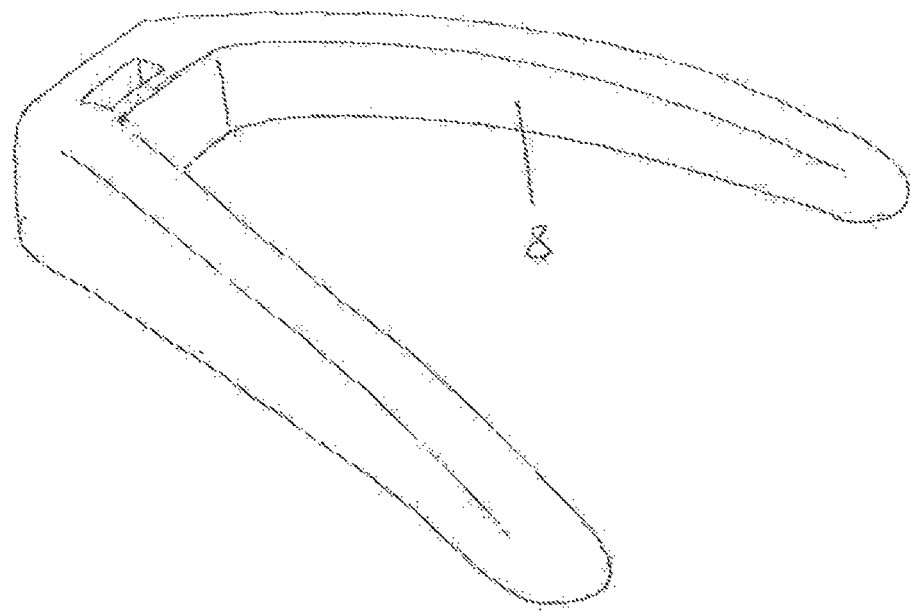
FIG. 2 is a schematic drawing of a dual foot of the single pedestal table of FIG. 1.
Figure 3:
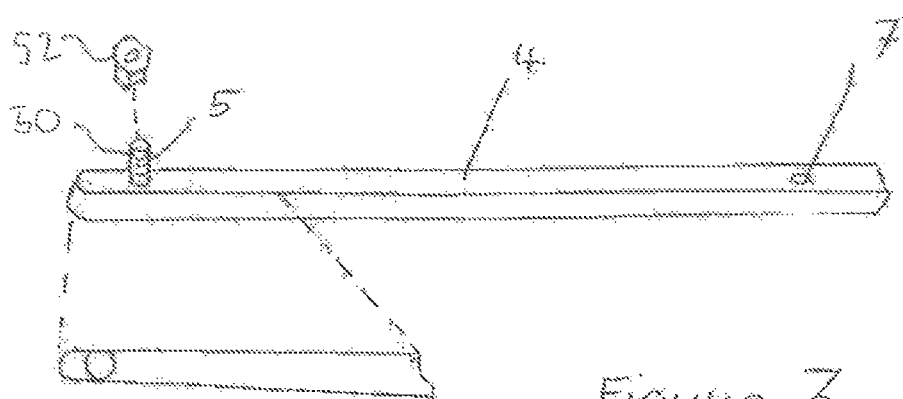
FIG. 3 is a schematic drawing of a clamp bar and spindle of the single pedestal table of FIGS. 1 and 2.

In this manner the covered sliding operator of the present invention allows substantially free movement of the spindle 5 along the entire distance of the slot 6 whilst the cover 10 completely covers the slot at all positions of the spindle 5. This is advantageous as it can prevent injury be stopping a user getting a finger crushed between the slot 6 and the spindle 5. As will be readily appreciated and has been discussed above, the sliding operator of the present invention can be easily incorporated in the single pedestal table 1 shown in FIGS. 1 to 3.

In another embodiment, shown in FIG. 8, the present invention may additionally comprise a biasing means 30 for correctly orientating the cover 10 when the cover 10 is not impinging on either the first or second impinging walls 16,17. In a simple embodiment the biasing means 30 is an elastic body, such as a spring 32, that is attached at a first end to the cover 10 and is attached at a second end to the body 5 in such a manner that the cover is biased in the correct orientation.

Further, the spindle 5 of the present invention may have a gripping means 40 formed at an outer end in order to allow a user to easily grip the spindle and allow it to be moved along the slot 6. As shown, the gripping means 40 is a vertical ridge. Further, the spindle 5 may comprise a bolt 50 and have a nut 52, or other clamping means, mounted thereon to allow a user to clamp the spindle 5 in a specific position along the slot 6. Further, as noted above, the first and/or second impinging walls 16, 17 are, in another exemplary embodiment, protrusions 60, 62 formed on the inner side of the body 3.

The invention claimed is:

1. A covered sliding operator comprising:
a body;
a slot formed in the body having a first end and a second end and a length extending from the first end to the second end;
a spindle extending through the slot and mounted to be slidable along the length of the slot; and
a generally oval cover rotatably mounted on the spindle;
wherein, the body has a first impinging wall formed on an inner side of the slot and spaced a distance from the first end of the slot and a second impinging wall formed on an inner side of the slot and spaced a distance from the second end of the slot; and
the cover is shaped such that:
when the spindle is central in the slot a width of the cover completely covers the slot, from the first end to the second end;
moving the spindle towards the first end of the slot moves the cover against the first impinging wall and causes it to rotate in a first direction such that the slot remains completely covered by the cover; and
moving the spindle towards the second end of the slot moves the cover against the second impinging wall and causes it to rotate in a second direction such that the slot remains completely covered by the cover.

2. A sliding operator according to claim 1, wherein the cover has two perpendicular axes, a vertical axis and a horizontal axis, a gradually curved perimeter, has a central hole for mounting on the spindle, and the perpendicular axes intersect the perimeter of the cover at four points about the perimeter such that, in a clockwise order about the perimeter of the cover:
the distance from a first intersection point to the center of the central hole is approximately equal to the distance from the first impinging wall to the position the hole is located in when the spindle is located at or near the first end of the slot and to the distance from the second impinging wall to the position the central hole is located in when the spindle is located at or near the second end of the slot;
the distance from a second intersection point to the center of the hole is equal to, or slightly greater than, the distance from the second end of the slot to the center of the slot when the spindle is centrally located within the slot;
the distance from a third intersection point to the center of the hole is equal to, or slightly greater than, the distance from the center of the hole to the first end of the slot when the spindle is located at or near the second end of the slot and is equal to, or slightly greater than, the distance from the center of the hole to the second end of the slot when the spindle is located at or near the first end of the slot; and
the distance from a fourth intersection point to the center of the hole is equal to, or slightly greater than, the distance from the first end of the slot to the center of the slot when the spindle is centrally located within the slot.

3. A sliding operator according to claim 2, wherein the first and second impinging walls are side walls of the body.

4. A sliding operator according to claim 2, wherein the first and second impinging walls are protrusions formed on an inner side of the body.

5. A sliding operator according to claim 2 wherein the slot is generally horizontal when the sliding operator is in use.

6. A sliding operator according to claim 2 wherein the slot is straight.

7. A sliding operator according to claim 2 wherein the slot is generally arcuate and is no more than a 45° section of a circle.

8. A sliding operator according to claim 2 additionally comprising a biasing means for correctly orientating the cover relative to the slot.

9. A sliding operator according to claim 1, wherein the first and second impinging walls are side walls of the body.

10. A sliding operator according to claim 1, wherein the first and second impinging walls are protrusions formed on an inner side of the body.

11. A sliding operator according to claim 1 wherein the slot is generally horizontal.

12. A sliding operator according to claim 1 wherein the slot is straight.

13. A sliding operator according to claim 1 wherein the slot is generally arcuate and is no more than a 45° section of a circle.

14. A sliding operator according to claim 13, wherein the slot is no more than a 15° section of a circle.

15. A sliding operator according to claim 1 additionally comprising a biasing means for orientating the cover relative to the slot so that the slot remains completely covered by the cover.

16. A sliding operator according to claim 1 additionally comprising gripping means formed at an outer end of the spindle.

17. A sliding operator according to claim 1 wherein the spindle comprises a bolt and has a nut or other clamping means mounted thereon for clamping the spindle in position relative to the slot.

18. An adjustable single pedestal table comprising:
a sliding operator, the sliding operator including a body, a spindle, and a generally oval cover;
a slot formed in the body having a first end and a second end and a length extending from the first end to the second end;
the spindle extending through the slot and mounted to be slidable along the length of the slot; and
the generally oval cover rotatably mounted on the spindle;
wherein, the body has a first impinging wall formed on an inner side of the slot and spaced a distance from the first end of the slot and a second impinging wall formed on an inner side of the slot and spaced a distance from the second end of the slot; and
the cover is shaped such that:
when the spindle is central in the slot a width of the cover completely covers the slot, from the first end to the second;
moving the spindle towards the first end of the slot moves the cover against the first impinging wall and causes it to rotate in a first direction such that the slot remains completely covered by the cover; and
moving the spindle towards the second end of the slot moves the cover against the second impinging wall and causes it to rotate in a second direction such that the slot remains completely covered by the cover.

19. An adjustable double pedestal table comprising:
a sliding operator, the sliding operator including a body, a spindle, and a generally oval cover;
a slot formed in the body having a first end and a second end and a length extending from the first end to the second end;
the spindle extending through the slot and mounted to be slidable along the length of the slot;
the generally oval cover rotatably mounted on the spindle;
wherein, the body has a first impinging wall formed on an inner side of the slot and spaced a distance from the first end of the slot and a second impinging wall formed on an inner side of the slot and spaced a distance from the second end of the slot; and
the cover is shaped such that:
when the spindle is central in the slot a width of the cover completely covers the slot, from the first end to the second;
moving the spindle towards the first end of the slot moves the cover against the first impinging wall and causes it to rotate in a first direction such that the slot remains completely covered by the cover; and
moving the spindle towards the second end of the slot moves the cover against the second impinging wall and causes it to rotate in a second direction such that the slot remains completely covered by the cover.

* * * * *